Figure 1:
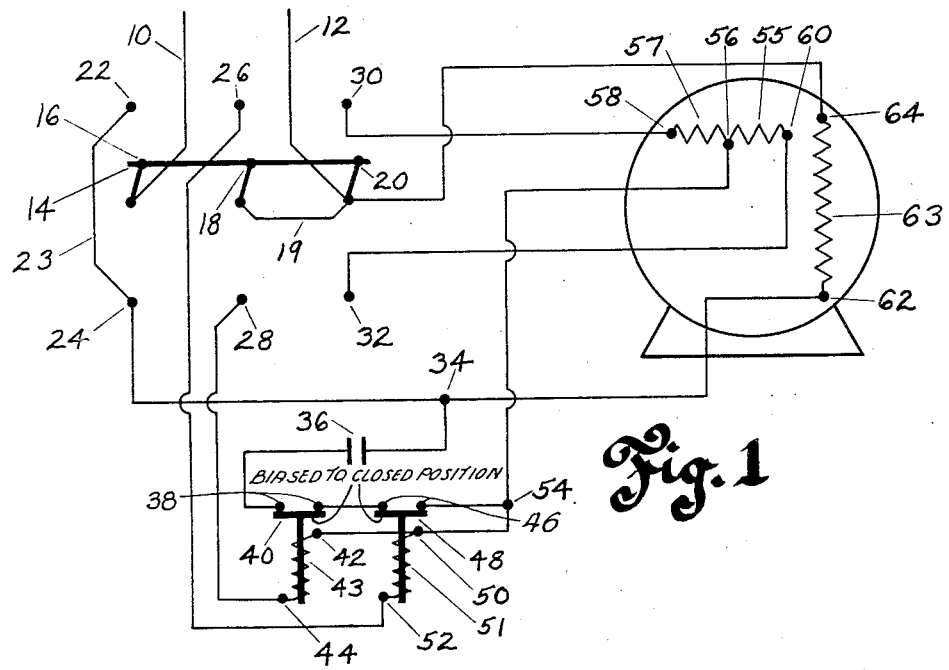

March 20, 1951  S. S. WOLFF ET AL  2,545,639

REVERSING CONTROL FOR DYNAMOELECTRIC MACHINES

Filed Nov. 6, 1946

INVENTORS
SAMUEL S. WOLFF AND
STANLEY WITT
BY
Roy M. Eilers
ATTORNEY

Patented Mar. 20, 1951

2,545,639

UNITED STATES PATENT OFFICE 2,545,639

REVERSING CONTROL FOR DYNAMO-ELECTRIC MACHINES

Samuel S. Wolff, Clayton, and Stanley Witt, St. Louis, Mo., assignors to Century Electric Company, a corporation of Missouri Application November 6, 1946, Serial No. 708,018

11 Claims. (Cl. 318—207)

This invention relates to improvements in dynamoelectric machines. More particularly, this invention relates to improvements in control circuits for reversible, single phase dynamoelectric machines.

It is, therefore, an object of the present invention to provide an improved control circuit for reversible, single phase dynamoelectric machines.

In the operation of single phase dynamoelectric machines, it is customary to provide a starting winding that is positioned in the housing of the motor together with the main or running winding, but is out of phase with the main winding. In many instances the phase displacement of the starting or phase winding relative to the main or running winding is obtained by connecting the main or running winding directly across the line while the starting or phase winding is connected to the line by means of a capacitor. Where this is done, the current in the starting or phase winding is displaced relative to the current in the main or running winding, and the resulting magnetic forces will apply a rotative force to the rotor of the motor. However, once the motor has gotten up to speed, it is desirable to disconnect and de-energize the starting or phase winding and to permit the main or running winding alone to drive the rotor. Several methods and apparatus have been proposed to permit energization of the starting or phase winding during that portion of the operating cycle of the dynamo electric machine when the rotor is stationary or is rotating below normal speed, and then to permit de-energization of the starting or phase winding when the dynamoelectric machine is running at its normal operating speed. Those methods and apparatus usually contemplate the use of a centrifugally-operated switch that responds to the speed of the rotor of the dynamoelectric machine to disconnect the split phase winding from the manually-operated control switch. Where the centrifugally-operated switches are constructed in such a way that frictional forces and wear are compensated for or are reduced to a minimum, the centrifugally-operated switches can effectively control the energization and de-energization of the split phase winding. However, where it is desirable, in single phase dynamoelectric machines equipped with centrifugally-operated switches, to utilize the electrical and magnetic forces of the phase and running windings to assist in obtaining the reversal of the direction of rotation of the rotor, it is necessary either to permit the rotor to slow down to the point where the centrifugally-operated control switch closes, or to provide auxiliary means that will by-pass the centrifugally-operated switch at the moment of reversal. Unless one or the other of these things is done, the movement of the manually-operated control switch into the reverse position will reconnect the main or running winding across the line without reconnecting the phase or starting winding across the line and, therefore, the main or running winding will continue to drive the rotor in the original direction. Thus, instead of assisting in obtaining the reversal of the direction of rotation of the rotor, the control circuit will act to speed up the rotor and keep it running in the original direction.

In several instances, a relay and an energizing circuit therefor have been used to by-pass the centrifugally-operated switch at the moment of reversal, thus obtaining energization of the phase or starting winding at the time the main or running winding is being re-energized by the proper actuation of the manually-operated control switch. Moreover, the relay and the energizing circuit would cooperate with the manually-operated control switch to energize the phase or starting winding in such a way that the magnetic forces generated by the phase and main windings would provide prompt slowing down and reversal of the rotor. However, the circuit for the relay must not only act to enable the relay to by-pass the centrifugally-operated switch at the moment of reversal but it also must act to keep the relay from by-passing that said switch during normal running operation of the dynamo electric machine. In several instances the control circuit for the relay and phase winding of the dynamoelectric machine took the form of two parallel subcircuits and a holding circuit: one subcircuit connecting the phase winding to the line through the centrifugally-operated switch, the second subcircuit connecting the phase winding to the line through one set of contacts bridged by the action of the relay armature, and the holding circuit connecting the relay coil to the line initially through the centrifugally-operated switch and secondarily through a second set of contacts bridged by the relay armature. With such a control circuit, the setting of the manually-operated control switch in the forward position will immediately connect the relay coil to the line through the centrifugally-operated switch, thus causing the relay coil to pull the relay armature into its secondary position and break the second subcircuit while it establishes the holding circuit through the second set of contacts, and the phase winding will be immediately energized by the first subcircuit through the centrifugally-operated switch. Thus the second subcircuit is initially broken and is maintained that way by the holding circuit, while the first subcircuit energizes the phase winding until the rotor gets up to speed and de-energizes the phase winding when the centrifugally-operated switch opens. The dynamoelectric machine will continue to run with its phase winding de-energized until the position of the manually-operated control switch is reversed. At that time, the holding circuit will be broken and the relay armature will fall back into its de-energized position, thus establishing the second subcircuit through the phase winding, and thereupon, the phase winding will be energized and will cooperate with the main winding to generate electric and magnetic forces that will slow down and reverse the rotor of the dynamoelectric machine. Thereafter, the relay will maintain the second subcircuit until the rotor slows down and permits the centrifugally-operated switch to close and energize the holding circuit and to continue the energization of the phase winding, thus breaking the second subcircuit and permitting the centrifugally-operated switch to control the duration of the energization of the phase winding.

Control circuits of this type are useful and operable as long as the time required for the relay armature to move from the contacts in the holding circuit to the contacts in the second subcircuit is less than the time required to reverse the position of the manually-operated control switch. Where, however, the time required for the relay armature to move from the contacts in the holding circuit to the contacts in the second subcircuit is longer than the time required to reverse the setting of the manually-operated control switch, the reversal of the setting of the control switch will re-energize the holding circuit before that circuit is broken and will thus cause the relay armature to be held out of the second subcircuit. Consequently, the main winding will be re-energized without a concomitant energization of the phase winding, and thus will cause the dyanmoelectric machine to continue to rotate in the forward direction despite the fact that the control switch is set in the reverse direction. Thus, control circuits of this character are just as reliable, and no more so, than the relays used with them. In most instances, the relays will operate with sufficient speed to enable the control circuit to operate in the manner intended, but in some instances the armatures of the relays will remain in the energized position for a part of a second or for one or two seconds after the circuit is broken. This need not be due to a failure or breakdown of the relays or their component parts since relays in good operating condition can experience such delays. Momentary sticking of the contact, residual magnetism of the coil, friction between the relatively movable parts, and other expected and ever-present causes will act to delay but not prevent the return of the relay armatures to de-energized position. In view of the fact that relay armatures are known to experience delayed movement upon de-energization of the relays, control circuits that rely on a relay to energize a holding circuit during the running of the dynamoelectric machine, to energize the phase winding during periods of reversal of rotation, and then to re-energize the holding circuit after the rotor of the dynamoelectric machine has come up to speed in the opposite direction are objectionable. The present invention obviates that objection by providing a control circuit for dynamoelectric machines that has one relay energizable only when the manually-operated control switch is in the forward position, and a second relay that is energizable only when the manually-operated control switch is in the reverse direction. It is, therefore, an object of the present invention to provide a control circuit for single phase dynamoelectric machines wherein one relay is energizable only when the manually-operated switch is in the forward position and wherein another relay is energizable only when said switch is in the reverse position.

The use of a centrifugally-operated switch to control the energization of the phase winding is workable and practical, but all wear and friction cannot be eliminated from such a switch. Moreover, where such a switch is used in a control circuit that is intended to provide prompt reversal of the direction of rotation of the rotor of the dynamoelectric machine, that switch must be provided with a by-passing circuit and a holding circuit. The presence of the wear and friction in the switch, and the need for a by-passing and a holding circuit makes the use of centrifugally-operated switches with reversible dynamoelectric machines objectionable. The present invention obviates this objection by providing a control circuit for dynamoelectric machines that does not employ a centrifugally-operated switch and still provides prompt and certain reversal of the rotors of dynamoelectric machines. It is, therefore, an object of the present invention to provide a control circuit that eliminates any need for a centrifugally-operated switch and still provides prompt and certain reversal of the rotors of dynamoelectric machines.

The control circuit of the present invention utilizes a pair of relays, one being connected to the forward contact of the manually-operated control switch and being capable of being connected in a closed series circuit with the phase winding, and the other relay being connected to the reverse contact of said switch and also being capable of being connected in a closed series circuit with said phase winding. With such a control circuit, the change in the voltage across the terminals of the phase winding, experienced as the rotor comes up to normal operating speed, can act to energize the relay connected to the phase winding at that time and to withdraw its armature from the circuit that connects the phase winding to the line. In this way, electric rather than centrifugal action is used to effect the deenergization of the phase winding. Moreover, by having one relay connected to the forward contact of the switch and by having the other relay connected to the reverse contact of the switch, such a control circuit completely prevents re-energization of the relays and the concomitant continued rotation of the rotor in the same direction, when and if one or the other of the relays sticks momentarily, since the forward relay is disconnected from the line when the switch is in the reverse position and it cannot therefore be re-energized even if it stuck temporarily. It will be noted that the two relays not only control the energization of the phase winding at the moment of reversal but they also control the length of time that winding is energized. By using such a circuit, the present invention provide a control circuit with one relay that is mum of parts and with almost complete elimination of mechanical wear and friction. It is, therefore, an object of the present invention to provide a control circuit with one relay that is connected to the forward contact of the control switch and is capable of being connected in a closed series circuit with the phase winding, and a second relay that is connected to the reverse contact of the control switch and is also capable of being connected in a closed series circuit with the phase winding.

Other objects and advantages of the present invention should become apparent from an examination of the drawing and the accompanying description.

In the drawing and accompanying description, two preferred embodiments of the invention are shown and described but it is to be understood that the drawing and accompanying description are for the purposes of illustration and do not limit the invention and that the invention will be defined by the appended claims.

Figure 2:
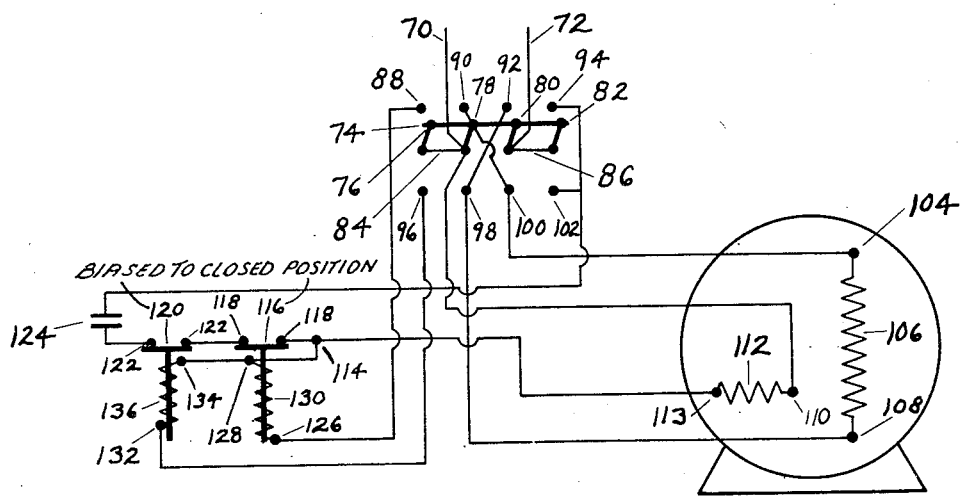

In the drawing,

Fig. 1 is a schematic diagram of a control circuit embodying the principles of teachings of the present invention, and Fig. 2 is a schematic diagram of another control circuit embodying the principles and teachings of the present invention.

Referring to the drawing in detail, the numeral 10 denotes one of the conductors of a single phase line, and the numeral 12 denotes the other conductor of that line. Positioned adjacent the ends of the conductors 10 and 12, and connected to those conductors, is a three pole double throw manually-operated control switch which has a rotatable bar or switch arm 14. Supported on and rotatable with the bar 14 are contacts 16 and 18 and 20, and the conductors 10 and 12 are attached directly to the contacts 16 and 20 respectively. Positioned adjacent the rotatable arm 14, and positioned so they are in register with the contacts 16, 18 and 20 of that arm are contacts 22, 24, 26, 28, 30 and 32, and rotation of the arm 14 into its upper position will connect contacts 16 and 22, 18 and 26, and 20 and 30 together while rotation of the arm 14 into its lower position will connect contacts 16 and 24, 18 and 28, and 20 and 32 together. Contacts 22 and 24 are permanently connected together by a bridging wire 23, and contacts 18 and 20 are permanently connected together by a bridging wire 19.

Connected to the switch are a number of circuits that interact to control the operation and the direction of rotation of the split phase motor that is diagrammatically shown at the right of Fig. 1. One of these circuits starts at conductor 10, and current will flow through movable contact 16, through contact 22 and bridging wire 23 to contact 24 or through contact 24 directly, through junction 34, through end terminal 62 of the main or running winding 63 of the single phase motor, through end terminal 64 of the winding 63 to the movable contact 20, and thence to conductor 12. This first circuit places the main or running winding 63 directly across the line whenever the switch is in its upper or lower position.

A second circuit starts at conductor 10, and current will flow through movable contact 16, through contact 22 and bridging wire 23 to contact 24 or through contact 24 directly, through junction 34, through capacitor 36, through relay armature 40 that bridges spaced relay contacts 38, through relay armature 48 that bridges spaced relay contacts 46, through junction 54 to terminal 56 and thereafter the current will, depending on the position of switch arm 14, either flow through the phase or starting winding 57 and end terminal 58 to contact 30 and thence through movable contact 20 to the conductor 12, or it will flow through the phase or starting winding 55 and end terminal 60 to contact 32 and thence through movable contact 20 to conductor 12. It will be noted that while the two starting or phase windings 57 and 55 are connected together at the terminal 56, only one of those windings will be energized at any one time, and it will further be noted that the current in the two windings 55 and 57 will flow in opposite directions. Thus it is possible to obtain rotation of the motor in the forward or reverse directions merely by moving the switch arm 14 so it energizes the desired phase or starting winding, because the direction of current flow in the main winding 63 remains the same irrespective of the setting of the switch arm 14.

A third circuit starts at conductor 10, and current will flow through movable contact 16, either contact 22 and bridging wire 23 to contact 24 or through contact 24 directly, through junction 34, through capacitor 36, through relay armature 40, through relay armature 48, through junction 54 to the upper terminal 50 of the relay coil 51 that surrounds and controls the movement of the relay armature 48. From upper terminal 50, the current can flow through relay coil 51, through lower terminal 52 to contact 26, and thence by means of movable contact 18 and bridging wire 19 to conductor 12; or the current can flow from upper terminal 50 through upper terminal 42 of relay coil 43, through coil 43, through lower terminal 44 to contact 28, and thence by means of movable contact 18 and bridging wire 19 to the conductor 12. It will be noted that this circuit will, depending on the position of the movable switch arm 14, connect one or the other of the relay coils 43 or 51 to the line conductors 10 and 12 through the relay armatures 40 and 48.

A fourth and a fifth circuit are provided by the wiring arrangement of Fig. 1, but these circuits are not dependent upon connection to the line conductors 10 and 12. The fourth circuit starts at contact 26, and current will flow through lower terminal 52, through relay coil 51, through upper terminal 50, through junction 54, through terminal 56, through the phase winding 57, and through end terminal 58 to contact 30, whence it will flow, by means of movable contact 20, bridging wire 19 and contact 18 to the contact 26 again. The fifth circuit starts at contact 28, and current will flow through lower terminal 44, through relay coil 43, through upper terminal 42, past upper terminal 50, through junction 54, through terminal 56, through phase winding 55, through end terminal 60 to the contact 32, and thence by means of movable contact 20, bridging wire 19 and contact 18 back to contact 28 again.

When the relay armatures 40 and 48 are in the closed circuit position shown in Fig. 1 and the switch arm 14 is in its upper position, the fourth circuit forms two paths that are in parallel relation between junction 54 and contact 30. One of the parallel paths will include terminal 56, the phase winding 57, and end terminal 58, while the other parallel path will include upper terminal 50, the relay coil 51, lower terminal 52, contact 26, movable contact 18, bridging wire 19 and movable contact 20. Similarly, when the relay armatures 40 and 48 are in the closed circuit position shown in Fig. 1 and the switch arm is in its lower position, the fifth circuit forms two paths that are in parallel relation between junction 54 and contact 32. One of the parallel paths will include terminal 56, the phase winding 55, and end terminal 60, while the other parallel path will include upper terminal 50, upper terminal 42, relay coil 43, lower terminal 44, contact 28, movable contact 18, bridging wire 19 and movable contact 20.

When, however, either of the relay armatures 40 or 48 is held away from the spaced relay contacts 38 or 46 in response to the energization of the relay coil 43 or 51, the fourth and fifth circuits are disconnected from conductor 10. At such time, if the switch arm 14 is in its upper position and one or the other of the relay armatures 40 and 48 is out of engagement with its respective contacts, the relay coil 51 will form a closed series circuit with the phase winding 57. Similarly, if the switch arm 14 is in its lower position and one or the other of the relay armatures 40 and 48 is out of engagement with its respective contacts, the relay coil 43 will form a closed series circuit with the phase winding 55.

Prior to the time the motor is started, the switch arm 14 will be in a position intermediate its upper and lower positions, and no current will be drawn from the line conductors 10 and 12. At such time, the relay armatures 40 and 48 will be in the position shown in Fig. 1, pressing against and bridging the spaced contacts 38 and 46. In actual practice, the relay armatures 40 and 48 can be biased toward the position shown in Fig. 1 by gravity or by resilient means or both and in any case, the biasing means should provide rapid bridging of the spaced contacts 38 and 46. When the motor is to be started, the switch arm 14 is moved to the upper or lower position, and for definiteness and simplicity of illustration, the switch arm 14 will be considered as having been moved to the upper position. Immediately three of the five circuits are established in the motor: (1) through the main windings 63, (2) through the capacitor 36 and the phase winding 57, and (3) through relay coil 51 and capacitor 36. The current in the phase winding 57 will be displaced relative to the current in the main windings 63, by reason of the action of capacitor 36, and the motor will start rotating. It will be noted that the phase winding 57 which has an appreciable inductive reactance and the capacitor 36, which has an appreciable capacitive reactance, are in series relation, and as a result, capacitance current will flow through the phase winding 57 and will add to the input voltage from the line. However, the relay coils 43 and 51 are both wound so they will not retract the armatures 40 and 48 until the voltage across their terminals is considerably greater than the line voltage. As a result, during the starting period of the operating cycle of the motor, the voltage across the upper and lower terminals 50 and 52 of the relay coil 51, which voltage will be the line voltage for all practical purposes, will be insufficient to cause enough current to flow through the relay coil 51 to overcome the biasing force on the relay armature 48. Accordingly, the armature relay 48 will remain in the position shown in Fig. 1 during the starting period and since the relay coil 43 is not connected across the line or across the phase winding 55 while the switch arm 14 is in its upper position, the relay armature 40 will remain in the position shown in Fig. 1 during the starting and running periods of the motor.

As the motor approaches normal running speed, the main winding 63 will interact with the phase winding 57 to induce a voltage in the phase winding 57 that is greater than the line voltage, and this induced voltage will cooperate with the added voltage caused by the flow of capacitance current through the phase winding 57 to provide a total voltage that is large enough to cause an increase in the current flowing through the relay coil 51 which will provide a sufficiently large force on the armature 48 to overcome the biasing force acting thereon and to pull the armature 48 away from the spaced relay contacts 46. This opens the circuit between the phase winding 57 and the capacitor 36 and it also opens the circuit between the relay coil 51 and the capacitor 36, thus bringing into operation the closed, series circuit between the phase winding 57 and the relay coil 51 and also decreasing the value of the voltage across the coil 51 by eliminating the added voltage caused by the flow of capacitance current through the phase winding 57. However, the closed series circuit will be able to provide enough current through relay coil 51 to hold armature 48 in retracted position because although the current through the relay coil 51 will be less, an armature requires fewer magnetic lines of force to hold it in retracted position than it requires to move into retracted position, and in addition, the magnetic efficiency of a relay is greater in retracted position. As a result of this interaction of the main winding 63, phase winding 57 and capacitor 36, the phase winding 57 is automatically disconnected from the line when the dynamoelectric machine reaches normal operating speed, and the relay armature 48 is held away from the spaced contacts 46 as long as the switch arm 14 is in the upper position and as long as the motor is running at normal speed. Thus the phase winding 57 is kept de-energized throughout the normal running cycle of the dynamoelectric machine.

When it is desired to reverse the direction of rotation of the dynamoelectric machine, the switch arm 14 is moved from the upper to the lower position. Immediately the following circuits are energized: (1) the circuit through the main winding 63, (2) the circuit through capacitor 36 and the phase winding 55, and (3) the circuit through the relay coil 43 and capacitor 36. By "immediately" is meant as promptly as the switch arm 14 can be rotated from its upper to its lower position and as promptly as the action of the spring or the action of gravity or the combined action of both can restore the relay armature 48 to the position shown in Fig. 1. It must be recognized that in most instances the return of the armature relay 48 will be as rapid or more rapid than the movement of switch arm 14 from its upper to its lower position, and in such instances the phase winding 55 will be energized without delay in a direction that will enable the magnetic forces of the windings 55 and 63 to cause the rotor to slow down and reverse its direction. However, it must also be recognized that normally-operating relays are subject to momentary delays in closing because of temporary sticking of the contacts or because of the residual magnetism in their coils, which magnetism has a powerful effect on the armature when the armature is in its retracted position, and such momentary delays would momentarily postpone energization of the phase winding 55. Such a delay is not important in the present arrangement, however, since the momentarily delayed relay is now disconnected from line conductor 10 and cannot be re-energized while in its retracted position to prevent energization of the phase winding 57. Instead, the momentary delay can only delay the energization of the phase winding 55 for a fraction of a second, since no current will flow through relay coil 51 and the action of gravity or the action of the spring will quickly overcome the sticking of the relay armature 48. Thus the present invention positively and completely avoids a situation where an energized relay, instead of being de-energized and then moving to closed circuit position for energization of the phase winding and for its own subsequent re-energization as it is intended to do, can be held momentarily in open circuit position, by sticking or by reason of residual magnetism while the manually-operated switch is being shifted, and can thus be re-energized without first moving to closed circuit position. Where this occurs the main winding will be re-energized without an energization of the phase winding and the main winding will cause the rotor to continue to operate in the original direction. Thus the desired reversal of rotation will not occur, and such reversal can then be obtained only by moving the manually-operated switch to open position and holding it there for several seconds until the relay armature falls back into closed circuit position. Thereafter, movement of the switch into the reverse position should effect reversal of the rotation of the dynamoelectric machine. However, this is far less desirable than the action obtained with the present invention, whereby immediate and positive reversal of the motor is obtained with but one movement of the switch.

There is no possibility that the voltage induced in the phase windings 55 and 57 will be high enough, at the moment the switch arm is shifted from one of its "on" positions to another, to cause either of the relay coils 43 or 51 to retract the armatures 40 or 48 and thus keep the phase windings from being energized, because the phase winding voltage at that moment is only sufficient to enable the relay coils 43 or 51 to hold armatures 40 and 48 in retracted position and is not sufficient to enable those coils to pull the armatures into retracted position. This reduced phase winding voltage is due to the fact that the capacitor 36 was disconnected from the phase windings prior to the time the control switch was reversed, and no capacitance current flowed through the phase winding. This reduced phase winding voltage will continue until both armatures return to closed-circuit position and thereafter, it will actually decrease even further as the magnetic forces of the main and phase windings interact to bring the rotor to a stop and then start it rotating in the opposite direction.

When the motor reaches its normal running speed in the opposite direction, the voltage induced in the phase winding 55 will cooperate with the added voltage caused by the flow of capacitance current through phase winding 55 to cause relay coil 43 to retract the armature 40. In fact, tests with an oscillograph have shown that the phase winding voltage has a locked-rotor value which approximates the line voltage, that the phase winding voltage quickly increases to a peak value appreciably above the initial value until one of the relays retracts its armature, and that thereafter the phase winding voltage momentarily falls to a value slightly above the initial value and then rises to a value intermediate the initial value and the peak value that energized the relay. While this intermediate value is insufficient to enable the relays to pull their armatures into retracted position, it is sufficient to enable the relays to hold the armatures in retracted position. The tests further showed that this intermediate voltage continued until the control switch was moved to the "off" position or to a reverse position. In the latter case, the phase winding voltage again fell to a value which approximated the initial value, and thereafter, as the main and phase windings interacted to slow down the rotor, the phase winding voltage decreased to a value less than the initial value, and then as the rotor began to rotate in the reverse direction, the phase winding voltage rose to a peak value which caused the other relay coil to retract its armature. Those tests showed positively that even if the retracted armature stuck momentarily and the main winding was re-energized, the phase winding voltage could not increase to such a value that the other relay would retract its armature when the retracted armature finally returned to closed circuit position. Consequently the control circuits of the present invention positively guarantee prompt and positive reversal of the motor. In fact, the control circuits of the present invention have effected the stopping and reversal of a motor in one hundred and three (103) cycles of a sixty (60) cycle alternating current and three (3) of those cycles were required to shift the control switch from the forward to the reverse position. More specifically, the control circuits of the present invention provide stopping and reversing of an electric motor in less than two (2) seconds. The results of these tests are borne out by the operation of the control circuits in the field, since no instance of an unsuccessful attempt at reversal with either of the circuits of this invention has been reported.

The circuit shown in Fig. 2 relates to a slightly different embodiment of the present invention. The numeral 70 denotes one of the conductors of a single phase line and the numeral 72 denotes the other conductor of that line. Positioned adjacent the ends of the conductors 70 and 72 is a four pole, double throw, manually-operated control switch which has a rotatable bar or switch arm 74. Supported on and rotatable with the bar 74 are contacts 76, 78, 80 and 82 and also supported on and rotatable with the bar 74 are bridging wires 84 and 86. The bridging wire 84 permanently connects contacts 76 and 78 together, and the bridging wire 86 permanently connects contacts 80 and 82 together. The conductors 70 and 72 are directly connected to the contacts 78 and 80 respectively. Positioned adjacent the rotatable switch arm 74, and positioned so they are in register with the contacts 76, 78, 80 and 82, are stationary contacts 88, 90, 92, 94, 96, 98, 100 and 102, and rotation of the switch arm 74 into its upper position will connect contacts 76 and 88, 78 and 90, 80 and 92, 82 and 94 together, while rotation of the switch arm 74 into its lower position will connect contacts 76 and 96, 78 and 98, 80 and 100, and 82 and 102 together.

Connected to the switch are a number of circuits that interact to control the direction of rotation of the single phase motor that is diagrammatically shown at the right of Fig. 2. One of the circuits starts at conductor 70, and current will flow through movable contact 78 through fixed contact 90, through contact 100, through upper terminal 104 of the main or running winding 106, through the lower terminal 108 of the winding 106, through contact 98 to contact 92, and thence to the movable contact 80 and conductor 72 of the line. This circuit places the main or running winding 106 directly across the line when the rotatable switch arm 74 is in its upper position and this circuit also places the main winding 106 across the line when the switch arm 74 is in its lower position. It will be noted, however, that the direction of current flow through the main winding 106 is in one direction when the switch arm 74 is in its upper position and is in the opposite direction when the switch arm 74 is in its lower position.

A second circuit starts at conductor 70, and current will flow past movable contact 78, through the end terminal 110 of the phase or starting winding 112, through the winding 112, through the other end terminal 113 of the winding 112, through the junction 114, through the relay armature 116 that bridges the spaced relay contacts 118, through the relay armature 120 that bridges the spaced relay contacts 122, through the capacitor 124 to the contact 94, and thence through the movable contact 82 and the bridging wire 86 to the conductor 72. Thus when the switch arm 74 is in its upper position and the relay armatures 116 and 120 are in the position shown in Fig. 2, the phase winding 112 will be placed across the line. When the movable switch arm 74 is in its lower position, the phase winding 112 will be placed across the same sides of the line since the right hand terminal 110 of that winding is permanently connected to the conductor 70 adjacent the contact 78, and since the left hand terminal 113 of the phase winding 112 will be connected to the line 72 through the relay armatures 116 and 120, capacitor 124, contact 102, contact 82 and bridging wire 86.

A third circuit starts at conductor 70, and current will flow through contact 78, through bridging wire 84 and movable contact 76 into one or the other of the contacts 88 and 96, and then, depending upon the position of the rotatable switch arm 74, the current will flow either through the bottom terminal 126 of relay coil 130, through the relay coil 130, and through the upper terminal 128 of relay coil 130 to the junction 114, or it will flow through the bottom terminal 132 of relay coil 136, through the relay coil 136, through the upper terminal 134 of the relay coil 136, and past the upper terminal 128 of the coil 130 to the junction 114, and thereafter the current will flow through the relay armatures 116 and 120, through the capacitor 124 to fixed contacts 94 or 102, and then through the movable contact 82 and the bridging wire 86 to conductor 72. With this circuit, the relay coil 130 will be placed across the line whenever the rotatable switch arm 74 is in its upper position and the relay armatures 116 and 120 are in the position shown in Fig. 2, and the relay coil 136 will be placed across the line whenever the switch arm 74 is in its lower position and the relay armatures 116 and 120 are in the position shown on Fig. 2.

A fourth and a fifth circuit are provided by the wiring arrangement of Fig. 2, but these circuits are not dependent upon connection to the line conductors 70 and 72. The fourth circuit starts at contact 78, and current will flow through the end terminal 110 of phase winding 112, through the phase winding 112, through the end terminal 113, through junction 114, through upper terminal 128, through relay coil 130, through lower terminal 126 to stationary contact 88, and thence through movable contact 76 and bridging wire 84 back to contact 78. The fifth circuit starts at contact 78, and current will flow through terminal 110, phase winding 112, terminal 113, junction 114, upper terminal 128, upper terminal 134, relay coil 136, lower terminal 132 to stationary contact 96, and thence through movable contact 76 and bridging wire 84 back to contact 78.

When the relay armatures 116 and 120 are in the position shown in Fig. 2, and the switch arm 74 is in its upper position, the fourth circuit forms two paths that are in parallel between contact 78 and junction 114; one of the parallel paths will include bridging wire 84, movable contact 76, stationary contact 88, lower terminal 126, relay coil 130, and upper terminal 128 while the other parallel path will include end terminal 110, phase winding 112, and end terminal 113. Similarly, when the relay armatures 116 and 120 are in the closed circuit position shown in Fig. 2, and the switch arm 74 is in its lower position, the fifth circuit forms two paths that are in parallel relation between contact 78 and junction 114; one of the parallel paths will include bridging wire 84, movable contact 76, stationary contact 96, lower terminal 132, relay coil 136, upper terminal 134, and upper terminal 128, while the other parallel path will include end terminal 110, phase winding 112 and end terminal 113.

When, however, either of the relay armatures 116 or 120 is held away from the spaced contacts 118 and 122 respectively, the fourth and fifth circuits will be disconnected from conductor 72. At such time, one or the other of the relay coils 130 and 136 will, depending on the position of switch arm 74, form a closed series circuit with the phase winding 112.

Prior to the time the motor is started, the switch arm 74 will be in a position intermediate its upper and lower positions, and no current will be drawn from the line. At such time, the relay armatures 116 and 120 will be in the position shown in Fig. 2, pressing against and bridging the spaced contacts 118 and 122. In actual practice, the relay armatures 120 and 116 can, in the manner of the relay armatures 40 and 48 of Fig. 1, be biased toward the position shown in Fig. 2 by gravity or by resilient means or by both. In any event, the biasing means should provide rapid bridging of the contacts 118 and 122.

When the motor is to be started, the switch arm 74 is moved to its upper or lower position, and for definiteness and simplicity of illustration, the switch arm 74 will be considered as having been moved to the upper position. Immediately three of the five circuits are established in the motor: (1) through the main winding 106, (2) through the phase winding 112 and capacitor 124, and (3) through the relay coil 130 and the capacitor 124. The current in the phase winding 112 will be displaced relative to the current in the main winding 106, by reason of the action of capacitor 124 and the motor will start rotating. During the starting period of the operating cycle of the motor, the voltage across the terminals 126 and 128 of the relay coil 130, which voltage will be the line voltage for all practical purposes, will be insufficient to cause enough current to flow through the coil 130 to overcome the biasing force on the relay armature 116. Accordingly, the relay armature 116 will remain in the position shown in Fig. 2 during the starting period; since the relay coil 136 is not connected across the line or across the phase winding 112, the relay armature 120 will remain in the position shown in Fig. 2 during the starting and running periods of the motor. As the motor approaches normal running speed, the main winding 106 will interact with the phase winding 112 to induce a voltage in the phase winding 112 that is greater than the line voltage; this induced voltage will cooperate with the added voltage caused by the flow of capacitance current through the phase winding 112 to provide a total voltage that is large enough to cause an increase in the current flowing through the relay coil 130 which will provide a sufficiently large force on the armature 116 to overcome the biasing force acting on armature 116 and pull the armature 116 away from the spaced relay contacts 118. This opens the circuit between the phase winding 112 and the conductor 72, and it also opens the circuit between the relay coil 130 and the conductor 72, thus bringing into operation the closed, series circuit between the phase winding 112 and the relay coil 130. This closed, series circuit will provide sufficient current through coil 130 to hold the armature 116 away from the spaced contacts 118 during the running period of the motor. In this way, the phase winding 112 is automatically disconnected from the line when the motor reaches normal operating speed and the relay armature 116 will be held away from the spaced contacts 118 as long as the switch arm 74 is in its upper position and as long as the motor is running at normal speed. Thus the phase winding 112 is kept de-energized throughout the normal running cycle of the motor.

When it is desired to reverse the direction of rotation of the motor, the switch arm 74 is moved from its upper to its lower position. Immediately, the following circuits will be energized: (1) the circuit through the main winding 106, although it is to be noted that now the direction of current flow through the main winding 106 will be reversed, (2) the circuit through the phase winding 112 and the capacitor 124, and (3) the circuit through the relay coil 136 and the capacitor 124. By "immediately" is meant as promptly as the switch arm 74 can be rotated from its upper to its lower position, and as promptly as the action of the spring or the action of gravity or the action of both can restore relay armature 116 to the position shown in Fig. 2. In this instance, just as in the control circuit of Fig. 1, it must be recognized that even when the relay armature 116 and the relay coil 130 are in perfectly operative condition, the armature 116 may be delayed a fraction of a second in restoring itself to the position shown in Fig. 2. Such a delay might be extremely disadvantageous in a circuit containing a relay that is to be de-energized momentarily to bring the starting or phase winding into the circuit and is then itself to be re-energized, because a momentary delay in such a circuit might hold the armature of that relay in the open circuit position during the time the running winding might be re-energized without an energization of the starting winding. This would result in continued rotation of the motor in the original direction, and would require either opening of the switch for a few moments and then restoring it to the reversing position, or would necessitate waiting until the motor slowed down and came to a stop before placing the control switch in the reverse position. All of this objectionable delay is completely and positively avoided by the present invention since the energized relay coil is definitely disconnected from the line and the previously unenergized coil is connected across the line; thus if there is any delay at all, it cannot cause re-energization of the main and running winding without being followed by an energization of the starting winding, and all of this with one setting of the control switch.

The principal differences between the control circuits of Fig. 1 and Fig. 2 are: (1) in the circuit of Fig. 1 the direction of current flow in the phase windings 55 and 57 is reversed upon reversal of the control switch whereas in the circuit of Fig. 2, the direction of current flow is always the same through the phase winding 112, (2) the direction of current flow in the main winding of Fig. 1 is always the same whereas in Fig. 2 the direction of current flow in the main winding is reversed with reversal of the control switch, and (3) in Fig. 2 a four pole, double throw switch is shown whereas in Fig. 1 a three pole, double throw switch is shown. In both control circuits of the present invention, the energized relay coil is definitely disconnected from the line when the control switch is placed in the reverse position, and it is not again connected to the line until the switch is restored to the forward position. This means that the relay which might be held momentarily due to residual magnetism or momentary sticking of the contacts is not depended upon to control the energization of the phase winding in the reverse direction but instead the relay which has previously been disconnected from the line is depended upon to provide the control for the starting and running period. In this way the present invention obviates any possibility of having the control switch fail to provide prompt and immediate reversal of the motor.

Whereas two preferred embodiments of the present invention have been shown and described in the drawing and accompanying description, it should be obvious to those skilled in the art that various changes can be made in the form of the invention without affecting its scope.

What we claim is:

1. A control circuit for a reversible, single phase motor that comprises a control switch, a main winding, a phase winding, a pair of relays having their contacts connected in series between said switch and said phase winding, one end of each of said relays being connected continuously to said phase winding, the other end of one of said relays being connected to said phase winding by one contact of said control switch and the other end of said other relay being connected to said phase winding by a second contact of said control switch, said control switch and the contacts of said relays normally connecting one or the other of the coils of said relays in parallel with said phase winding whenever said relay contacts are closed and the control switch is in an "on" position, one or the other of said relay coils being in a closed series circuit with said phase winding whenever any of said relay contacts are open, said switch being adapted to effect relative reversal of current flow between the phase and main windings, said contacts of said switch being spaced apart so that shifting of said switch will disconnect the previously energized relay coil from the line and from said phase winding and will permit energization of the previously unenergized relay coil.

2. A control circuit for a reversible dynamoelectric machine that comprises a manually-operated control switch with a forward position and a reverse position, a phase winding, a first relay, a second relay, the contacts of said relays being in series with each other and with the line through said switch and phase winding, the coil of said first relay being continuously connected in series with said phase winding and one contact of said switch, the coil of said second relay being continuously connected in series with said phase winding and a second contact of said switch, said first and second switch contacts being spaced apart and being so positioned that current flows through said one switch contact when said switch is in forward position and so current flows through said second switch contact when said switch is in reverse position, said relays responding to settings of said switch and to voltages induced in said phase winding and to line voltage to open their contacts and thereby disconnect said phase winding from the line.

3. A control circuit for a reversible dynamoelectric machine that comprises a control switch, a main winding, a phase winding, and a pair of relays, the coil of one of said relays being continuously connected in series with said phase winding and a contact of said control switch, the coil of the second of said relays being continuously connected in series with said phase winding and a second contact of said control switch, said relays normally connecting said phase winding to the line but being selectively energizable to open their contacts and thereby disconnect said phase winding from the line; said switch selectively connecting said first or second contacts with said phase winding whereby one or the other said relay coils can be selectively connected in a closed series circuit with said phase winding.

4. A control circuit for a reversible dynamoelectric machine that comprises a control switch, a main winding, a phase winding, and a pair of relays, the coil of one of said relays being continuously connected in series with said phase winding and a contact of said control switch, the coil of the second of said relays being continuously connected in series with said phase winding and a second contact of said control switch, the contacts of said first relay and a third contact of said control switch being connected in series between said phase winding and the line, the contacts of said second relay and a fourth contact of said control switch being connected in series between said phase winding and the line, the contacts of said relays normally connecting said phase winding to the line but being selectively actuable to disconnect said phase winding from the line, said switch selectively connecting said first or second contacts with said phase winding whereby one or the other said relay coils can be selectively connected in a closed series circuit with said phase winding.

5. A control circuit for a reversible dynamoelectric machine that comprises a control switch, a main winding, a phase winding, and a pair of relays, the coil of one of said relays being continuously connected in series with said phase winding and a contact of said control switch, the coil of the second of said relays being continuously connected in series with said phase winding and a second contact of said control switch, the contacts of said first relay and a third contact of said control switch being connected in series between said phase winding and the line, the contacts of said first relay and a fifth contact of said control switch being connected in series between the coil of said first relay and the line, the contacts of said second relay and a fourth contact of said control switch being connected in series between said phase winding and the line, the contacts of said second relay and a sixth contact of said control switch being connected in series between the coil of said second relay and the line, the contacts of said relays normally connecting said phase winding to the line but being selectively actuable to disconnect said phase winding from the line, said switch selectively connecting said first or second contacts with said phase winding whereby one or the other said relay coils can be selectively connected in a closed series circuit with said phase winding.

6. A control circuit for a reversible dynamoelectric machine that comprises a control switch, a main winding, a phase winding, and a pair of relays, the coil of one of said relays being continuously connected in series with said phase winding and a contact of said control switch, the coil of the second of said relays being continuously connected in series with said phase winding and a second contact of said control switch, said relays normally connecting said phase winding to the line but being selectively energizable to disconnect said phase winding from the line, said switch selectively connecting said first or second contacts with said phase winding whereby one or the other said relay coils can be selectively connected in a closed series circuit with said phase winding, said coils of said relays being dimensioned so line voltage and voltage induced in said phase winding are required to energize said coils.

7. A control circuit for a reversible dynamoelectric machine that comprises a main winding, a phase winding, a control switch with a forward position and a reverse position, a plurality of relays, contacts on said control switch that connect the coil of one of said relays in a closed series circuit with said phase winding when said control switch is in forward position, other contacts on said switch that connect the coil of another of said relays in a closed series circuit with said phase winding when said control switch is in reverse position, and the contacts of said relays selectively connecting said phase winding and one relay coil to the line in parallel relation, said coils being dimensioned so said relays are not actuated when line voltage is applied but will be actuated when voltages induced in said phase winding due to rotation of said dynamo electric machine are added to line voltage.

8. A control circuit for a reversible dynamoelectric machine that comprises a main winding, a phase winding, a control switch with a forward position and a reverse position, a plurality of relays, contacts on said control switch that connect the coil of one of said relays in a closed series circuit with said phase winding when said control switch is in forward position, other contacts on said switch that connect the coil of another of said relays in a closed series circuit with said phase winding when said contract switch is in reverse position, and the contacts of said relays selectively connecting said phase winding and one relay coil to the line in parallel relation, said coils being dimensioned so said relays are not actuated when line voltage is applied but will be actuated when voltages induced in said phase winding due to rotation of said dynamoelectric machine are added to line voltage, said first contacts of said control switch being spaced from said other contacts of said control switch whereby said control switch can place only one relay coil in closed series circuit with said phase winding at any one time.

9. A control circuit for a reversible, single phase motor that comprises a control switch with two "on" positions, a main winding, a phase winding, a pair of relays having their contacts connected between said switch and said phase winding, one end of the coil of each of said relays being connected continuously to said phase winding, the other end of the coil of one of said relays being connected to said phase winding by the contacts of said one relay and by one contact of said control switch and the other end of the coil of said other relay being connected to said phase winding by the contacts of said other relay and by a second contact of said control switch, said control switch and the contacts of said relays normally connecting one or the other of the coils of said relays in parallel with said phase winding whenever said relay contacts are closed and the control switch is in an "on" position, one or the other of said relay coils being in a closed series circuit with said phase winding whenever its relay contacts are open, said switch being adapted to effect relative reversal of current flow between the phase and main windings, said contacts of said switch being spaced apart so that shifting of said switch will disconnect the previously energized relay coil from the line and from said phase winding and will permit energization of the previously unenergized relay coil.

10. In a control circuit for reversible dynamoelectric machines, a control switch with a forward position and a reverse position, a main winding and a plurality of electromagnetic coils, contacts controlled by said coils, said control switch connecting said phase winding in a closed series circuit with one of said coils whenever said control switch is in forward position and also connecting said one coil and said phase winding to the line in parallel relation whenever the contacts controlled by said one coil are in closed position and said control switch is in forward position, said control switch connecting said phase winding in a closed series circuit with another of said coils whenever said control switch is in reverse position and also connecting said other coil and said phase winding to the line in parallel relation whenever the contacts controlled by said other coil are in closed position and said control switch is in reverse position, said coils being dimensioned so they will not actuate said contacts when carrying line voltage but will actuate said contacts when carrying line voltage and voltage induced in said phase winding.

11. In a control circuit for reversible dynamoelectric machines, a control switch with a forward position and a reverse position, a main winding, a phase winding, and a plurality of relays, the terminals of the coil of one of said relays being continuously connected to the terminals of said phase winding in a series circuit whenever said control switch is in its forward position, the terminals of another of the coils of said relays being continuously connected to the terminals of said phase winding in a series circuit whenever said control switch is in its reverse position, said relay coils being dimensioned so voltages induced in said phase winding can, when added to line voltage, cause opening of the contacts of said relays, the contacts of said relays selectively connecting said phase winding and the coils of said relays to the line in parallel relation through said control switch, said relay coils selectively responding to voltages, experienced when said dynamoelectric machines are rotating, to actuate said contacts and disconnect said phase winding from the line.

SAMUEL S. WOLFF.
STANLEY WITT.

REFERENCES CITED

The following references are of record in the file of this patent:

UNITED STATES PATENTS

| Number | Name | Date |
|---|---|---|
| 2,188,804 | Bocker | Jan. 30, 1940 |
| 2,263,324 | Wiest | Nov. 18, 1941 |
| 2,285,687 | Snyder | June 9, 1942 |
| 2,388,382 | Brongersma | Nov. 6, 1945 |
| 2,407,994 | Menzies | Sept. 24, 1946 |